United States Patent
Asati et al.

(10) Patent No.: US 7,602,737 B2
(45) Date of Patent: Oct. 13, 2009

(54) METHODS AND APPARATUS FOR PROVIDING AN ENHANCED DYNAMIC MULTIPOINT VIRTUAL PRIVATE NETWORK ARCHITECTURE

(75) Inventors: Rajiv Asati, Morrisville, NC (US); Mohamed Khalid, Cary, NC (US); Brian E. Weis, San Jose, CA (US); Pratima Pramod Sethi, Maharashtra (IN)

(73) Assignee: Cisco Technology, Inc., San Jose, CA (US)

( * ) Notice: Subject to any disclaimer, the term of this patent is extended or adjusted under 35 U.S.C. 154(b) by 516 days.

(21) Appl. No.: 11/414,787

(22) Filed: May 1, 2006

(65) Prior Publication Data

US 2007/0206597 A1    Sep. 6, 2007

(51) Int. Cl.
    *H04L 12/28* (2006.01)
(52) U.S. Cl. ........................ 370/255; 370/401
(58) Field of Classification Search ........................ None
    See application file for complete search history.

(56) References Cited

U.S. PATENT DOCUMENTS

| | | | |
|---|---|---|---|
| 5,809,233 A * | 9/1998 | Shur | 709/230 |
| 7,028,092 B2 * | 4/2006 | MeLampy et al. | 709/230 |
| 7,409,709 B2 * | 8/2008 | Smith et al. | 726/15 |
| 7,421,483 B1 * | 9/2008 | Kalra | 709/220 |
| 7,447,901 B1 * | 11/2008 | Sullenberger et al. | 713/153 |
| 2005/0138204 A1 * | 6/2005 | Iyer et al. | 709/242 |
| 2005/0270972 A1 * | 12/2005 | Kodialam et al. | 370/216 |
| 2006/0050653 A1 * | 3/2006 | Guichard et al. | 370/254 |

\* cited by examiner

*Primary Examiner*—Pankaj Kumar
*Assistant Examiner*—Eunsook Choi (57) ABSTRACT

A system transmits, to a hub from a first spoke, first routing information associated with the first spoke. The system receives, at the first spoke, from the hub, second routing information associated with a plurality of spokes in communication with the hub. The plurality of spokes includes a second spoke. The system resolves, at the first spoke, a next hop determination for the packet based on the second routing information received from the hub. The system routes the packet from the first spoke to the second spoke using the next hop determination.

20 Claims, 5 Drawing Sheets

```
┌─────────────────────────────────────────────────────────────────────┐
│ 205 TRANSMIT, TO THE HUB FROM A FIRST SPOKE, FIRST ROUTING          │
│ INFORMATION ASSOCIATED WITH THE FIRST SPOKE                         │
│                                                                     │
│   ┌─────────────────────────────────────────────────────────────┐   │
│   │ 206 REGISTER WITH A POLICY SERVER TO RECEIVE A POLICY       │   │
│   │                                                             │   │
│   │   ┌─────────────────────────────────────────────────────┐   │   │
│   │   │ 207 REGISTER WITH THE HUB TO RECEIVE THE GROUP      │   │   │
│   │   │ POLICY, THE GROUP POLICY TO BE USED TO              │   │   │
│   │   │ AUTHENTICATE WITH THE PLURALITY OF SPOKES           │   │   │
│   │   │ INCLUDING THE SECOND SPOKE                          │   │   │
│   │   └─────────────────────────────────────────────────────┘   │   │
│   └─────────────────────────────────────────────────────────────┘   │
│                                │                                    │
│                                ▼                                    │
│   ┌─────────────────────────────────────────────────────────────┐   │
│   │ 208 RECEIVE, FROM THE POLICY SERVER, THE POLICY             │   │
│   └─────────────────────────────────────────────────────────────┘   │
│                                │                                    │
│                                ▼                                    │
│   ┌─────────────────────────────────────────────────────────────┐   │
│   │ 209 AUTHENTICATE, WITH THE HUB, USING THE POLICY            │   │
│   └─────────────────────────────────────────────────────────────┘   │
└─────────────────────────────────────────────────────────────────────┘
```

*FIG. 3*

210 TRANSMIT, TO THE HUB FROM A FIRST SPOKE, FIRST ROUTING INFORMATION ASSOCIATED WITH THE FIRST SPOKE

211 ADVERTISE, TO THE HUB, A PLURALITY OF FIRST SPOKE ROUTES WITH WHICH THE FIRST SPOKE IS ASSOCIATED

OR

212 TRANSMIT, TO THE HUB, FROM THE FIRST SPOKE, A NOTIFICATION THAT A NEW ADDRESS FOR THE FIRST SPOKE HAS REPLACED A PREVIOUS ADDRESS, THE NOTIFICATION INCLUDING A FLAG SIGNALING THE HUB TO RECOGNIZE THE NEW ADDRESS ASSOCIATED WITH THE FIRST SPOKE

213 RECEIVE NOTIFICATION THAT THE HUB HAS RECOGNIZED THE NEW ADDRESS OF THE FIRST SPOKE, AND RELEASED THE PREVIOUS ADDRESS

OR

214 RECEIVE NOTIFICATION THAT THE HUB HAS DETECTED THAT A THIRD SPOKE, WITHIN THE PLURALITY OF SPOKES, HAS BECOME UNREACHABLE

215 RECEIVE NOTIFICATION THAT THE HUB HAS TRANSMITTED A PURGE REQUEST TO THE FIRST SPOKE AND THE PLURALITY OF SPOKES INCLUDING THE SECOND SPOKE, THE PURGE REQUEST NOTIFYING THAT THE THIRD SPOKE IS UNREACHABLE

METHODS AND APPARATUS FOR PROVIDING AN ENHANCED DYNAMIC MULTIPOINT VIRTUAL PRIVATE NETWORK ARCHITECTURE

CROSS REFERENCE TO RELATED APPLICATIONS

The present application claims the benefit of Indian Patent Application No. 540/DEL/2006, filed on Mar. 1, 2006, which is incorporated herein by reference.

BACKGROUND

Virtual Private Networks (i.e., VPNs) provide a secured means for transmitting and receiving data between network nodes even though many users share a corresponding physical network supporting propagation of the data. Privacy is maintained through the use of a tunneling technique, such as generic routing encapsulation (GRE). The data transmitted between such network nodes may or may not be encrypted to protect against eavesdropping and tampering by unauthorized parties. Because the physical network is shared, costs of using resources are generally reduced for each of many users.

A type of VPN is known as a Dynamic Multipoint VPN (DMVPN). DMVPN allows users to better scale large and small Internet Protocol Security (IPSec) VPNs by combining Generic Routing Encapsulation (GRE) tunnels, IPSec encryption, and Next Hop Resolution Protocol (NHRP) to provide users with easy configuration.

Internet Protocol Security (IPSec) VPNs are built as a collection of point-to-point links. The most efficient way to manage larger and larger collections of these point-to-point links is to arrange them into hub-and-spoke networks. All traffic from behind one spoke (i.e., the traffic from networks that must travel through the spoke to get to the hub) to behind another spoke will need to traverse first to the hub and then back out to the other spoke.

Routers define nodes in a network, and data travels between the nodes in a series of so-called "hops" over the network. Since each router is typically connected to multiple other routers, there may be multiple potential paths between given computers. Typically, the routing information is employed in a routing table in each router, which is used to determine a path to a destination computer or network. The router makes a routing decision, using the routing table, to identify the next "hop," or next router, to send the data to in order for it to ultimately reach the destination computer.

In a DMVPN environment, each spoke has a "permanent" i.e. always-on IPSec tunnel to a hub, but not to the other spokes within the network. Each spoke registers as clients of the NHRP server, which may reside in the hub. The hub maintains an NHRP database of the publicly routable address(es) of each spoke. Each spoke registers its binding of "publicly routable" address and (private) tunnel address when it boots and becomes capable of querying its NHRP database for the publicly routable addresses of the destination (remote) spokes in order to build direct tunnels to the destination spokes, when needed.

When a spoke needs to send a packet to a destination subnet on another (remote) spoke, it queries the NHRP server for publicly routable address of the destination (remote) spoke. The spoke also obtains the 'next hop' for that destination spoke from the NHRP server. After the originating spoke learns the peer address of the remote spoke, it can initiate a dynamic IPSec tunnel to the remote spoke. The spoke-to-spoke tunnels are established on-demand whenever there is traffic between the spokes. Thereafter, packets are able to bypass the hub and use the spoke-to-spoke tunnel.

SUMMARY

Conventional technologies for spoke-to-spoke traffic within a Dynamic Multipoint VPN (DMVPN) suffer from a variety of deficiencies. In particular, conventional technologies for spoke-to-spoke traffic within a VPN are limited in that the time it takes for a spoke to query the NHRP server for the next hop ultimately causes delays in the network. For example, real-time traffic, such as Voice over IP (VoIP) or Video over DMVPN requires a real-time response. Additional delay is also introduced by the peer-to-peer IPSec establishment between the spokes. The overall delay can take, for example, five or more seconds. DMVPN is also restricted to peer-to-peer IPSec relationships.

Embodiments disclosed herein significantly overcome such deficiencies and provide a system that includes a route determining process that resolves the next hop upon learning of a route from one spoke to another. In a DMVPN network, each spoke establishes a connection with a hub, and advertises to the hub, all the routes associated with that spoke using a routing protocol. The hub, in turn, transmits all these routes (from all the spokes) to all the spokes using a routing protocol. As soon as a spoke learns of these routes, the spoke contacts the NHRP server to obtain the next hop for those routes. Thus, when a spoke sends a packet to another spoke, no time is wasted obtaining the next hop information from the NHRP server (since the spoke has previously obtained this information). Additionally, in one embodiment, each spoke is configured with a group key, removing the need to map a particular key to each spoke. Thus, each spoke needs only to establish a session with the hub, instead of each spoke being required to establish a session with every other spoke during the transmission of packets between spokes. Every spoke forms an IKE peering with a group key server to exchange the group key through the unicast or multicast mechanism. This enables each spoke within the DMVPN to send the data to another spoke while encrypting the data using the associated group key. Each spoke uses the group key to decrypt the traffic. The DMVPN architecture no longer has the limitation of spoke-to-hub-to-spoke forwarding, and provides any to any encryption.

Each spoke triggers the next hop resolution immediately after the routing information is learned with the next hop (that is not present in the NHRP cache table). If the tunnel source address changes, then the NHRP registration request will be triggered immediately and will also contain a new flag. This forces the next hop server (NHS) to honor the new address, instead of ignoring the new address. The NHS will update its cache and convey this information to other NHRP clients i.e. spokes as well. If a spoke becomes unreachable, the NHS sends out a purge request for the unreachable spoke to all the other spokes to prevent the other spokes from needlessly trying to contact the unreachable spoke.

Embodiments disclosed herein provide a system that includes a route determining process that determines a route with which to transmit a packet. The route determining process, residing on a first spoke, transmits, to the hub, first routing information associated with the first spoke. In return, the route determining process receives, from the hub, second routing information associated with a plurality of spokes (includes a second spoke) in communication with the hub. The routing determining process resolves, at the first spoke, a next hop determination for the packet based on the second routing information received from the hub. The routing determining process then routes the packet from the first spoke to the second spoke using the next hop determination.

During an example operation of one embodiment, suppose a network includes a hub, group key server, NHRP server, Spoke 1, Spoke2 and Spoke3. In an example embodiment, the hub, group key server (i.e., a policy server), and NHRP server (i.e., a next hop server) exist on the same server. Spoke 1, Spoke2 and Spoke3 and the group key server are configured with a group key configuration. Each of the three spokes (Spoke 1, Spoke2 and Spoke3) establishes an IPSec peering session with the group key server to obtain the group key. Through a unicast (or multicast) method, the group key server pushes the group key to each of the three spokes (Spoke 1, Spoke2 and Spoke3). The group key is to be used for spoke to hub traffic as well as spoke-to-spoke traffic. Each of the three spokes (Spoke 1, Spoke2 and Spoke3) establishes an NHRP peering with the hub. Each of the three spokes (Spoke 1, Spoke2 and Spoke3) advertises their VPN routes to the hub. The hub, in turn, propagates those routes to every spoke (Spoke 1, Spoke2 and Spoke3). As soon as each spoke learns the remote routes, each of the three spokes (Spoke 1, Spoke2 and Spoke3) resolves the next hop for those routes via the NHRP server. This information is cached on each of the three spokes (Spoke1, Spoke2 and Spoke3). During Spoke1 to Spoke2 traffic, Spoke1 can begin to forward a packet to the next hop without any delay or packet loss because the next hop (toward Spoke2) has already been resolved and cached on Spoke1, and the encryption/decryption key is already available to every member within the group Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein provide a system that includes a route determining process that resolves the next hop upon learning of a route from one spoke to another. In a DMVPN network, each spoke establishes a connection with a hub, and advertises to the hub, all the routes associated with that spoke. The hub, in turn, transmits all these routes (from all the spokes) to all the spokes. As soon as a spoke learns of these routes, the spoke contacts the NHRP server to obtain the next hop for those routes. Thus, when a spoke sends a packet to another spoke, no time is wasted obtaining the next hop information from the NHRP server (since the spoke has previously obtained this information). Additionally, in one embodiment, each spoke is configured with a group key, removing the need to map a particular key to each spoke. Thus, each spoke needs only to establish a session with the hub, instead of each spoke being required to establish a session with every other spoke during the transmission of packets between spokes. Every spoke forms an IKE peering with a group key server to exchange the group key through the unicast (or multicast) mechanism. This enables each spoke within the DMVPN to send the data to another spoke while encrypting the data using the associated group key. Each spoke uses the group key to decrypt the traffic. The DMVPN architecture does not have the limitation of spoke to hub to spoke forwarding, and provides any to any encryption.

Each spoke triggers the next hop resolution immediately after the routing information is learned with the next hop (that is not present in the NHRP cache table). Irrespective of number of next hops being resolved, the spoke would allocate only logical interface per GRE tunnel. If the tunnel source address changes the NHRP registration request will set a flag. This forces the next hop server (NHS) to honor the new address, instead of ignoring the new address. If a spoke becomes unreachable, the NHS sends out a purge request for the unreachable spoke to all the other spokes to prevent the other spokes from needlessly trying to contact the unreachable spoke.

Embodiments disclosed herein provide a system that includes a route determining process that determines a route with which to transmit a packet. The route determining process, residing on a first spoke, transmits, to the hub, first routing information associated with the first spoke. In return, the route determining process receives, from the hub, second routing information associated with a plurality of spokes (includes a second spoke) in communication with the hub. The routing determining process resolves, at the first spoke, a next hop determination for the packet based on the second routing information received from the hub. The routing determining process then routes the packet from the first spoke to the second spoke using the next hop determination.

Figure 1:
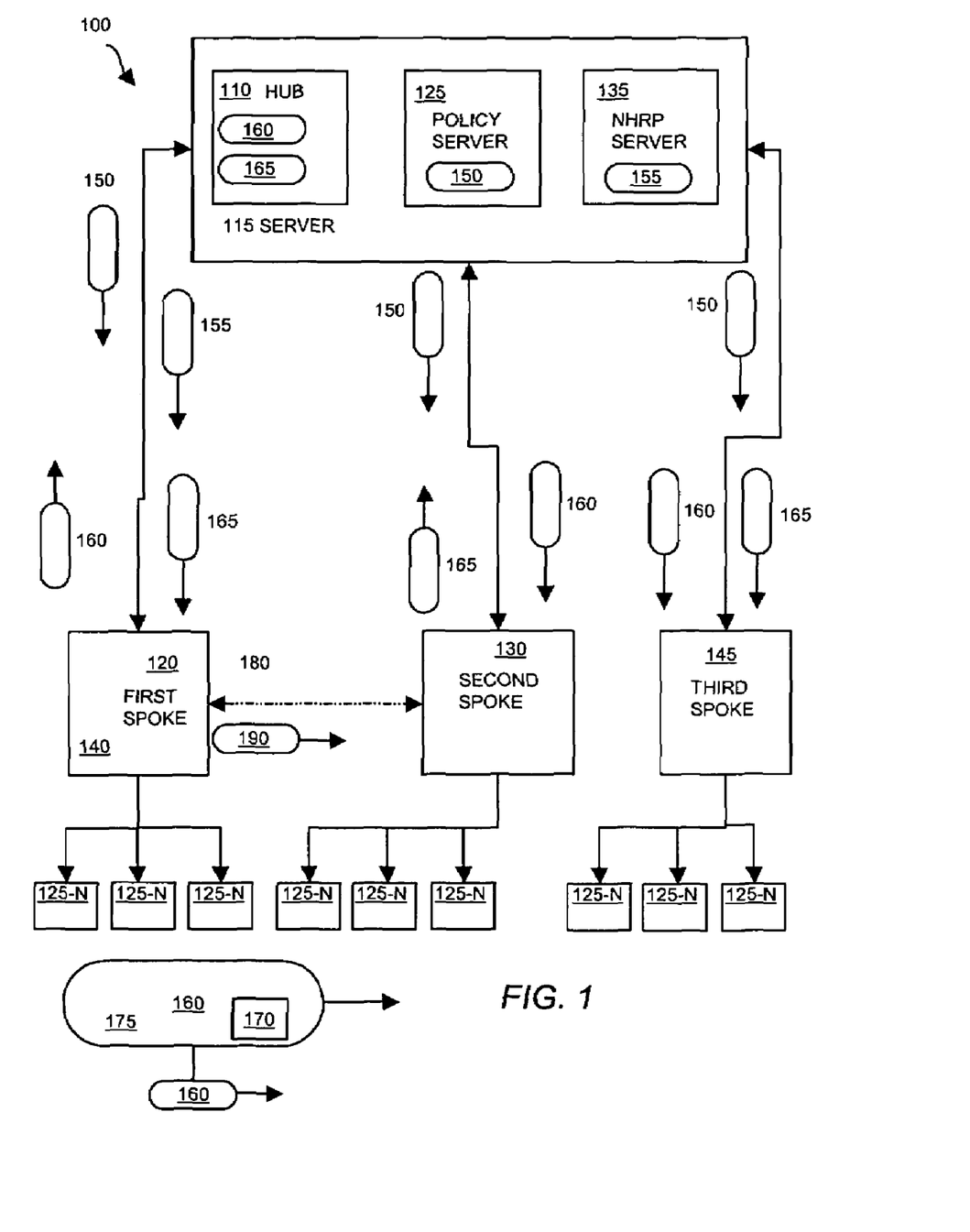
FIG. 1 shows a high level view of a network wherein a route determining process routes packets, according to one embodiment disclosed herein.

FIG. 1 illustrates an example computer-networking environment 100 suitable for use in explaining example embodiments disclosed herein. A server 115 (containing a hub 110, policy server 125 and NHRP server 135) connects to a first spoke 120, a second spoke 130, and third spoke 145. In an example configuration, the hub 110, policy server 125 and NHRP server 135 can reside on separate servers. The route determining process 140 resides on the first spoke 120. In an example configuration, the route determining process 140 can also reside on the server 115, the hub 110, the policy server 125, the NHRP server 135, the second spoke 130 and/or the third spoke 145.

The first spoke 120 transmits first routing information 160 (related to the networks 125-N associated with the first spoke 120) to the hub 110. The hub 110 stores the first routing information 160 related to the networks 125-N (associated with the first spoke 120). The second spoke 130 transmits second routing information 165 (related to the networks 125-N associated with the second spoke 130) to the hub 110. The hub 110 stores the second routing information 165 related to the networks 125-N (associated with the second spoke 130). The hub 110 transmits the first routing information 160 and second routing information 165 to all of the spokes (of course, the first spoke 120 need not receive the first routing information 160, and the second spoke 130 need not receive the second routing information 165)). That is, the first spoke 120 receives second routing information 165 related to the second spoke 130, and the second spoke 130 receives first routing information 160 related to the first spoke 120.

Each of the spokes (i.e., the first spoke 120, the second spoke 130, and the third spoke 145) sends a request to the policy server 125 to receive a policy 150. In one embodiment, the policy 150 is a group key. The first spoke 120 transmits a request to the NHRP server 155, and receives a next hop determination 155. In one embodiment, the first routing information 160 contains a new address 175 for the first spoke 120, and a flag 170. The flag 170 signals to the hub 110, that the first routing information 160 contains a new address 175. The first spoke 120, when transmitting a packet 190 from the first spoke 120 to the second spoke 130 via a tunnel 180, uses the policy 150 received from the policy server 125. The first spoke 120 already has the next hop determination 155 received from the NHRP server 135.

The route determining process 140 may be embodied as software code such as data and/or logic instructions (e.g., code stored in the memory or on another computer readable medium such as a removable disk) that supports processing functionality according to different embodiments described herein.

It is noted that example configurations disclosed herein include the online route determining process 140 itself (i.e., in the form of un-executed or non-performing logic instructions and/or data). The route determining process 140 may be stored as an application on a computer readable medium (such as a floppy disk), hard disk, electronic, magnetic, optical, or other computer readable medium. The route determining process 140 may also be stored in a memory system such as in firmware, read only memory (ROM), or, as in this example, as executable code in, for example, Random Access Memory (RAM). Those skilled in the art will understand that the server 115, hub 110, policy server 125, NHRP server 135, first spoke 120, second spoke 130, and third spoke 145 may include other processes and/or software and hardware components, such as an operating system not shown in this example.

Further details of configurations explained herein will now be provided with respect to a flow chart of processing steps that show the high level operations disclosed herein.

Figure 2:
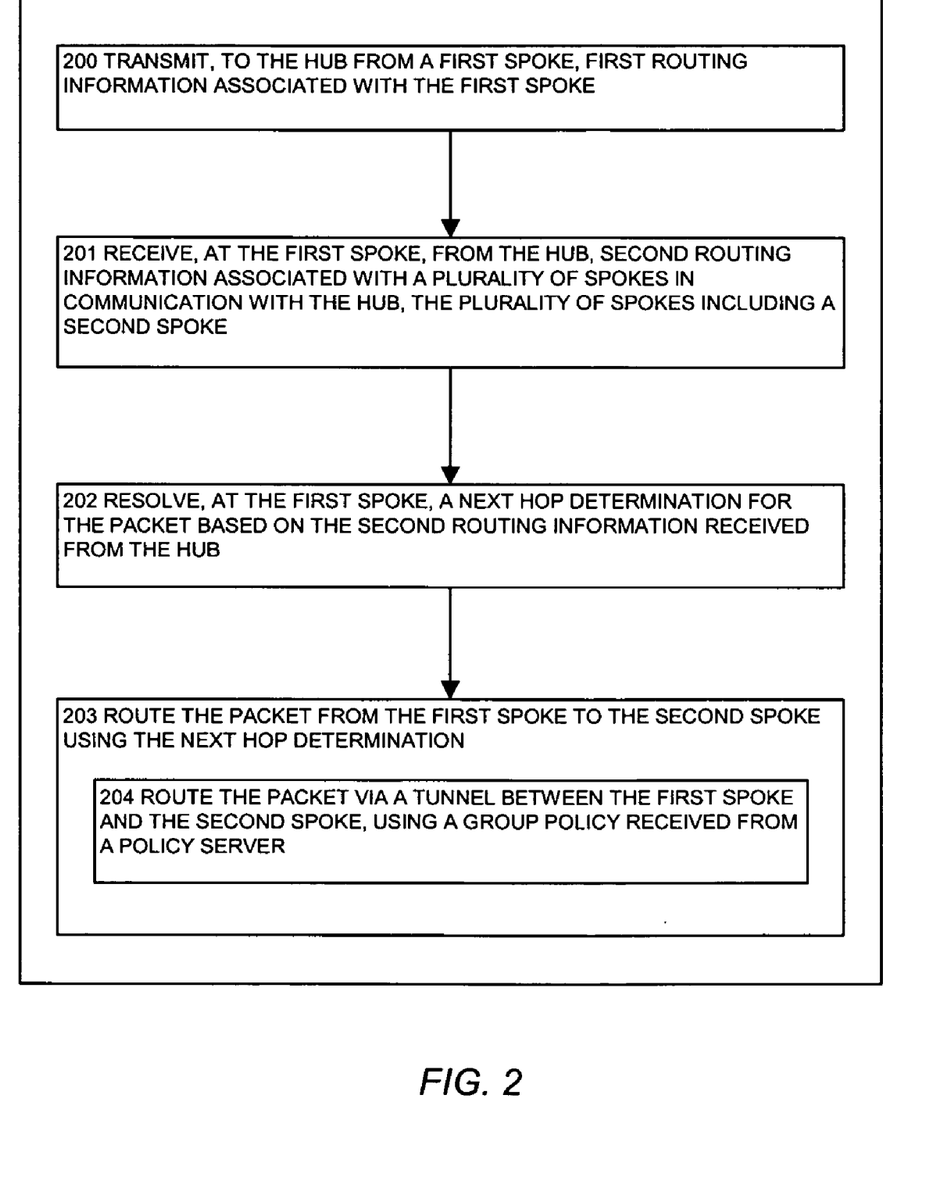
FIG. 2 illustrates a flowchart of a procedure performed by the system of FIG. 1 when the route determining process transmits, to the hub from a first spoke, first routing information associated with the first spoke, according to one embodiment disclosed herein.

FIG. 2 is a flowchart of the steps performed by the route determining process 140, residing on the first spoke 120, when it transmits to the hub 110 first routing information 160 associated with the first spoke 120, and receives second routing information 165 from the hub 110.

In step 200, the route determining process 140 transmits, to the hub 110, first routing information 160 associated with the first spoke 120. In an example configuration, the first spoke 120 is one of a plurality of spokes connected to the hub 110. The first spoke 120 in communication with a plurality of networks 125-N. Each of the other spokes in the plurality of spokes is also in communication with a plurality of networks 125-N. The first spoke 120 has a plurality of routes (i.e., first routing information 160) with which the first spoke 120 is in communication. The route determining process 140, residing on the first spoke 120, transmits the first routing information 160 (i.e., the plurality of routes with which the first spoke 120 is in communication) to the hub 110.

In step 201, the route determining process 140, residing on the first spoke 120 receives, at the first spoke 120, from the hub 110, second routing information 165 associated with a plurality of spokes in communication with the hub 110, the plurality of spokes including a second spoke 130. In an example configuration, there exists a plurality of spokes connected to the hub 110. The plurality of spokes includes the second spoke 130. The second spoke 130 in communication with a plurality of networks 125-N. The second spoke 130 has a plurality of routes (i.e., second routing information 165) with which the second spoke 130 is in communication. The second spoke 130 transmits the second routing information 165 (i.e., the plurality of routes with which the second spoke 130 is in communication) to the hub 110. The hub 110 transmits the second routing information 165 (received from the second spoke 130) to the first spoke 120. Additionally, the hub 110 transmits the first routing information 160 (received from the first spoke 120) to the second spoke 130. In other words, every spoke connected to the hub 110 receives the routing information associated with the other spokes connected to the hub 110. In an example configuration, the route determining process 140 resides on at least one spoke within the plurality of spokes that are connected to the hub 110. In another example configuration, the route determining process 140 also resides on the hub 110.

In step 202, the route determining process 140, residing on the first spoke 120 resolves a next hop determination for the packet 190, based on the second routing information 165 received from the hub 110. In an example configuration, the first spoke 120 obtains second routing information 165 associated with the second spoke 130. The second routing information 165 is received from the hub 110. Upon receipt of the second routing information 165, the first spoke 120 transmits a NHRP request to an NHRP server 135, and in return, receives a next hop determination 155 (for example, the next hop in the route traversing the first spoke 120 toward the second spoke 130). During transmission of the packet 190 from first spoke 120 to the second spoke 130, no time is lost obtaining the next hop determination 155 from the NHRP server 135 because the next hop determination 155 was obtained at the time the second routing information 165 was received (by the first spoke 120) from the hub 110.

In step 203, the route determining process 140, residing on the first spoke 120, routes the packet 190 from the first spoke 120 to the second spoke 130 using the next hop determination 155. In an example configuration, the path from the first spoke 120 to the second spoke 130 comprises a series of hops. The first spoke 120 obtains, from the hub 110, a plurality of routes traversing from the second spoke 130 throughout the network. This plurality of routes is the second routing information 165 that the first spoke 120 received from the hub 110. At the time this second routing information 165 is received (by the first spoke 120) from the hub 110, the first spoke 120 requests the next hop determination 155 from the NHRP server 135. The next hop determination 155 is the next hop among the series of hops traversing from the first spoke 120 to the second spoke 130. Thus, when the first spoke 120 transmits the packet 190 from the first spoke 120 to the second spoke 130, the first spoke 120 routes the packet 190 using the next hop determination 155 received from the NHRP server 155. In an example configuration, every spoke within the plurality of spokes receives routing information associated with every other spokes that is in communication with the hub 110, and every spoke requests the next hop determination 155 to travel toward to every other spoke within the plurality of spokes. Thus, when a particular spoke receives a packet 190, the next hop determination 155 for that packet 190 has already been obtained from the NHRP server 135. Thus, no time is lost relaying the packet 190 toward the next hop along the path toward the destination spoke.

In step 204, the route determining process 140, residing on the first spoke 120, routes the packet 190 via a tunnel 180 between the first spoke 120 and the second spoke 130, using a group policy 150 received from a policy server 125. In an example configuration, the first spoke 120 creates a tunnel 180 between the first spoke 120 and the second spoke 130. The tunnel 180 is encrypted for security using a group policy 150 obtained from the policy server 125. The second spoke 130, upon receiving the packet 190, will use the group policy 150 to decrypt the received packet 190.

Figure 3:
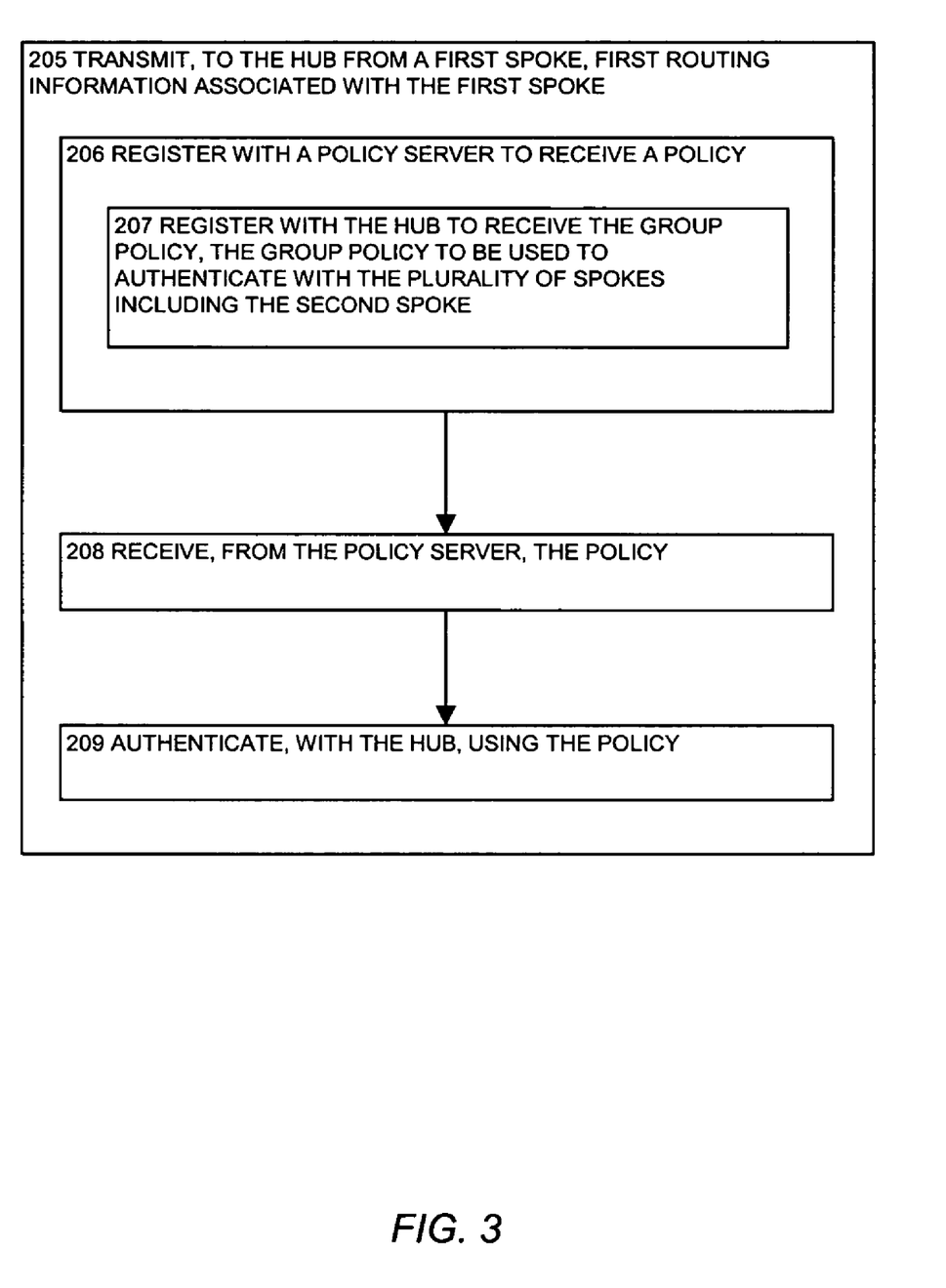
FIG. 3 illustrates a flowchart of a procedure performed by the system of FIG. 1 when the route determining process transmits, to the hub from a first spoke, first routing information associated with the first spoke, and registers with a policy server, according to one embodiment disclosed herein.

FIG. 3 is a flowchart of the steps performed by the route determining process 140, residing on the first spoke 120, when it transmits to the hub 110 first routing information 160 associated with the first spoke 120, and receives a policy 150 to use during transmission of a packet 190.

In step 205, the route determining process 140 transmits, to the hub 110, first routing information 160 associated with the first spoke 120. In an example configuration, the first spoke 120 is one of a plurality of spokes connected to the hub 110. The first spoke 120 in communication with a plurality of networks 125-N. Each of the other spokes in the plurality of spokes is also in communication with a plurality of networks 125-N. The first spoke 120 has a plurality of routes (i.e., first routing information 160) with which the first spoke 120 is in communication. The route determining process 140, residing on the first spoke 120, transmits the first routing information 160 (i.e., the plurality of routes with which the first spoke 120 is in communication) to the hub 110.

In step 206, the route determining process 140, residing on the first spoke 120 registers with a policy server 125 to receive a policy 150. In an example configuration, when the first spoke 120 connects to the hub 110, the first spoke 120 registers with the policy server 125 to receive a policy 150 to use when sending a packet 190 to other spokes. In an example configuration, the policy server 125 is a server separate from the policy server 125 and the NHRP server 155. In another example configuration, the policy server 125 can reside on the hub 110 or the NHRP server 155. In yet another configuration, the hub 110, the policy server 125 and the NHRP server 155 can all reside on the same server.

In step 207, the route determining process 140, residing on the first spoke 120 registers with the hub 110 to receive the group policy 150, the group policy 150 to be used to authenticate with the plurality of spokes including the second spoke 130. In an example configuration, the policy server 125 is a group policy server 125, and the policy 150 provided by the group policy server 125 is a group policy 150. In another example configuration, the group policy server 125 is the hub 110. In this example, the first spoke 120 registers with the hub 110 to receive the group policy 150 to use when transmitting a packet 190 to other spokes, for example, the second spoke 130.

In step 208, the route determining process 140, residing on the first spoke 120 receives, from the policy server 125, the policy 150. In an example configuration, the group policy server 125 is the hub 110, and the first spoke 120 registers with the hub 110 to receive the group policy 150. The group policy 150 is used when transmitting a packet 190 to other spokes, for example, the second spoke 130.

In step 209, the route determining process 140, residing on the first spoke 120 authenticates, with the hub 110, using the policy 150. In an example configuration, the first spoke 120 authenticates with the hub 110 using the policy 150 provided by the policy server 125.

Figure 4:
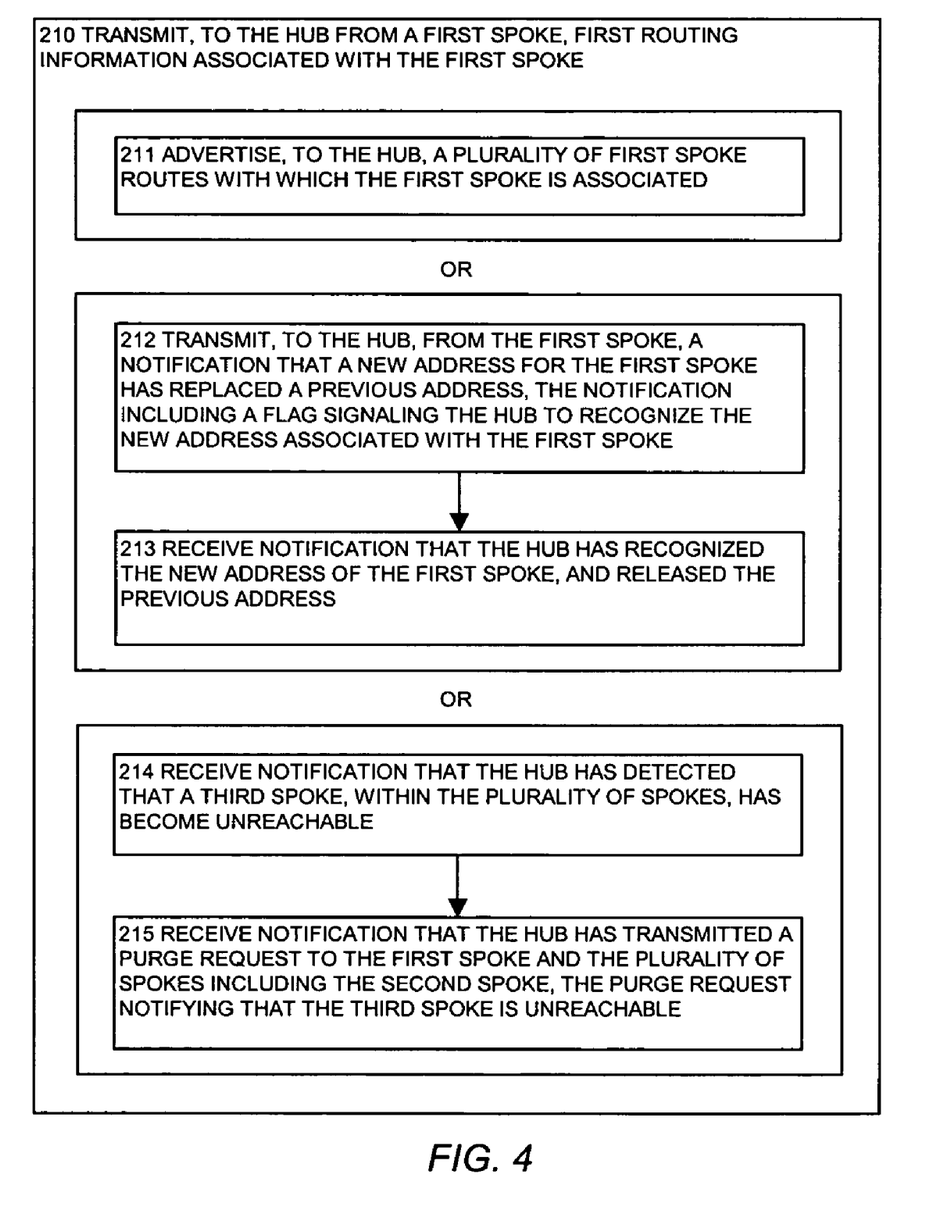
FIG. 4 illustrates a flowchart of a procedure performed by the system of FIG. 1 when the route determining process transmits, to the hub from a first spoke, first routing information associated with the first spoke, advertising a plurality of first spoke routes with which the first spoke is associated, according to one embodiment disclosed herein.

FIG. 4 is a flowchart of the steps performed by the route determining process 140, residing on the first spoke 120, when it transmits, to the hub 110, first routing information 160 associated with the first spoke 120, and advertises a plurality of routes with which the first spoke 120 is associated.

In step 210, the route determining process 140 transmits, to the hub 110, first routing information 160 associated with the first spoke 120. In an example configuration, the first spoke 120 is one of a plurality of spokes connected to the hub 110. The first spoke 120 in communication with a plurality of networks 125-N. Each of the other spokes in the plurality of spokes is also in communication with a plurality of networks 125-N. The first spoke 120 has a plurality of routes (i.e., first routing information 160) with which the first spoke 120 is in communication. The route determining process 140, residing on the first spoke 120, transmits the first routing information 160 (i.e., the plurality of routes with which the first spoke 120 is in communication) to the hub 110.

In step 211, the route determining process 140, residing on the first spoke 120 advertises, to the hub 110, a plurality of first spoke routes with which the first spoke 120 is associated.

The plurality of first spoke routes (i.e., first routing information 160) is the routes with which the first spoke 120 is associated. In an example configuration, the first spoke 120 is one of a plurality of spokes connected to the hub 110. The first spoke 120 in communication with a plurality of networks 125-N. Each of the other spokes in the plurality of spokes is also in communication with a plurality of networks 125-N. The first spoke 120 has a plurality of routes (i.e., first routing information 160) with which the first spoke 120 is in communication.

Alternatively, in step 212, the route determining process 140, residing on the first spoke 120 transmits, to the hub 110, from the first spoke 120, a notification that a new address 175 for the first spoke 120 has replaced a previous address. The notification includes a flag 170 signaling the hub 110 to recognize the new address 175 associated with the first spoke 120. In an example configuration, the address of the first spoke 120 has changed. The first spoke 120 conveys this change in address to the hub 110. For example, within the first routing information 160 transmitted to the hub 110 from the first spoke 120, the first routing information 160 includes the new address 175 of the first spoke 120, and a flag 170. The flag 170 signifies to the hub 110 to re-write the address information associated with the first spoke 120 (i.e., the new address 175) and proceed with the registration of the first spoke 120. In an example embodiment, the route determining process 140 updates a next-hop database at the hub 110 with the new address 175, and transmits (from the hub 110) to the other spokes, a notification that the address associated with the first spoke 120, has changed.

In step 213, the route determining process 140, residing on the first spoke 120 receives notification that the hub 110 has recognized the new address 175 of the first spoke 120, and released the previous address. In an example configuration, the first spoke 120 transmits to the hub 110 first routing information 160 including the new address 175 of the first spoke 120, and a flag 170 (signifying to the hub 110 to re-write the address information associated with the first spoke 120). In response, the first spoke 120 receives notification that the hub 110 has recognized the new address 175 of the first spoke 120, and released the previous address (i.e., the old address).

Alternatively, in step 214, the route determining process 140, residing on the first spoke 120 receives notification that the hub 110 has detected that a third spoke 145, within the plurality of spokes, has become unreachable. In an example configuration, the hub 110 has a plurality of spokes in communication with the hub 110. Inevitably, a spoke, such as the third spoke 145, becomes unreachable to the hub 110. The route determining process 140, residing on the first spoke 120 receives notification that the hub 110 has detected that a third spoke 145, within the plurality of spokes, has become unreachable. In an example embodiment, the route determining process 140 receives a purge reply from the first spoke 120 and the plurality of spokes including the second spoke 130. The purge reply notifies that the next-hop database has been updated.

In step 215, the route determining process 140, residing on the first spoke 120 receives notification that the hub 110 has transmitted a purge request to the first spoke 120, and the plurality of spokes, including the second spoke 130. The purge request notifies that the third spoke is 145 unreachable. In an example configuration, the hub 110 detects that the third spoke 145 has become unreachable. The hub 110 transmits a purge request to the spokes in communication with the third spoke 145 (i.e., including the first spoke 120 and the second spoke 130). The purge request notifies the spokes that the third spoke 145 is unreachable. Without the purge request, the spokes (i.e., the first spoke 120 and the second spoke 130 and other spokes in communication with the third spoke 145) would continue to attempt to communicate with the third spoke 145 using the next hop determination 155 previously obtained from the NHRP server 135. When those attempts failed, the spokes (i.e., the first spoke 120 and the second spoke 130 and other spokes in communication with the third spoke 145) might repeatedly attempt to communicate with the third spoke 145, causing unnecessary delays in the network 100.

Figure 5:
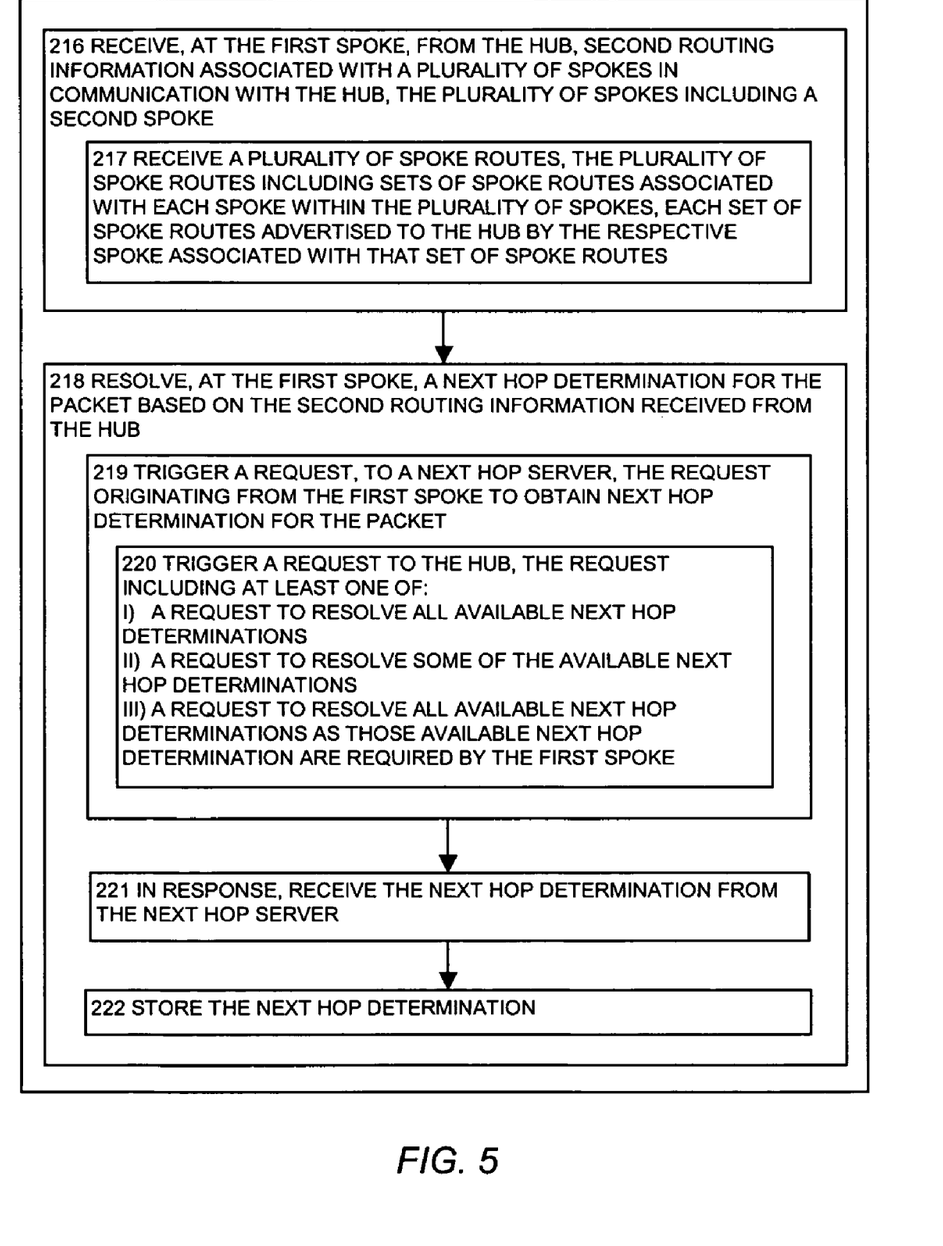
FIG. 5 illustrates a flowchart of a procedure performed by the system of FIG. 1 when the route determining process receives, at the first spoke, from the hub, second routing information associated with a plurality of spokes in communication with the hub, the plurality of spokes including a second spoke, according to one embodiment disclosed herein.

FIG. 5 is a flowchart of the steps performed by the route determining process 140, residing on the first spoke 120, when it receives, at the first spoke 120, from the hub 110, second routing information 165, and resolves a next hop determination 155 for a packet 190, based on the received second routing information 165.

In step 216, the route determining process 140, residing on the first spoke 120 receives, at the first spoke 120, from the hub 110, second routing information 165 associated with a plurality of spokes in communication with the hub 110, the plurality of spokes including a second spoke 130. In an example configuration, there exists a plurality of spokes connected to the hub 110. The plurality of spokes includes the second spoke 130. The second spoke 130 in communication with a plurality of networks 125-N. The second spoke 130 has a plurality of routes (i.e., second routing information 165) with which the second spoke 130 is in communication. The second spoke 130 transmits the second routing information 165 (i.e., the plurality of routes with which the second spoke 130 is in communication) to the hub 110. The hub 110 transmits the second routing information 165 (received from the second spoke 130) to the first spoke 120. Additionally, the hub 110 transmits the first routing information 160 (received from the first spoke 120) to the second spoke 130. In other words, every spoke connected to the hub 110 receiving the routing information associated with the other spokes connected to the hub 110. In an example configuration, the route determining process 140 resides on at least one spoke within the plurality of spokes that are connected to the hub 110. In another example configuration, the route determining process 140 also resides on the hub 110.

In step 217, the route determining process 140, residing on the first spoke 120, receives a plurality of spoke routes. The plurality of spoke routes includes sets of spoke routes associated with each spoke within the plurality of spokes. Each set of spoke routes is advertised to the hub 110 by the respective spoke associated with that set of spoke routes. In other words, each spoke, in communication with the hub 110, maintains a set of spoke routes for communicating with other spokes. Each spoke advertises this set of spoke routes to the hub 110. For example, the first spoke 120 advertises first routing information 160 (i.e., the set of spoke routes with which the first spoke 120 is in communication) to the hub 110, the second spoke 130 advertises second routing information 165 (i.e., the set of spoke routes with which the second spoke 130 is in communication), and the third spoke 145 advertises third routing information (not shown) (i.e., the set of spoke routes with which the third spoke 145 is in communication) to the hub 110. In return, the hub 110 transmits the first routing information 160 and the second routing information 165 to the third spoke 145, the first routing information 160 and the third routing information (not shown) to the second spoke 130, and the second routing information 165 and third routing information (not shown) to the first spoke 120. Thus, the route determining process 140, residing on the first spoke 120, receives a plurality of spoke routes, including sets of spoke routes associated with each spoke within the plurality of spokes.

In step 218, the route determining process 140, residing on the first spoke 120 resolves a next hop determination for the packet 190, based on the second routing information 165 received from the hub 110. In an example configuration, the first spoke 120 obtains second routing information 165 associated with the second spoke 130. The second routing information 165 is received from the hub 110. Upon receipt of the second routing information 165, the first spoke 120 transmits a NHRP request to an NHRP server 135, and in return, receives a next hop determination 155. During transmission of the packet 190 from first spoke 120 to the second spoke 130, no time is lost obtaining the next hop determination 155 from the NHRP server 135 because the next hop determination 155 was obtained at the time the second routing information 165 was received (by the first spoke 120) from the hub 110.

In step 219, the route determining process 140, residing on the first spoke 120, triggers a request, to a next hop server 135. The request originates from the first spoke 120, to obtain a next hop determination 155 for the packet 190. In an example configuration, the first spoke 120 has a packet 190 to be transmitted to the second spoke 130. The first spoke 120 triggers a request (for a next hop determination 155) to the next hop server 135 at the time the first spoke 120 receiving the second routing information 165 from the hub 110. The second routing information 165 is associated with the second spoke 130.

In step 220, the route determining process 140, residing on the first spoke 120 triggers a request to the hub 110, the request including at least one of: a request to resolve all available next hop determinations 155, a request to resolve some of the available next hop determinations 155, or a request to resolve all available next hop determinations 155 as those available next hop determination 155 are required by the first spoke 120. In an example configuration, the policy server 125 resides on the hub 110. The next hop determination 155 contains quality of service information associated with the packet 190. In an example embodiment, the first spoke 120 triggers a request to the next hop server 135 to obtain the next hop determination 155 for use in transmitting a packet 190 from the first spoke 120 to the second spoke 130. In an example embodiment, the first spoke 120 receives all the available next hop determinations 155 from the hub 110. In this scenario, the first spoke 120 has the capacity to maintain all the next hop determinations 155 from the hub 110. In another example embodiment, the first spoke 120 receives some of the available next hop determinations 155 from the hub 110. In this scenario, the first spoke 120 may have a capacity limit that prevents the first spoke 120 from caching all the available next hop determinations 155. In yet another example embodiment, the first spoke 120 receives none of the available next hop determinations 155 from the hub 110. In this scenario, the first spoke 120 resolves the available next hop determinations 155 as those available next hop determinations 155 are required by the first spoke 120. There may be a delay on the network 100 in transmitting the packet 190 (i.e., from the first spoke 120 to the second spoke 130) when the first spoke resolves the next hop determination 155 at the time the next hop determination 155 is required by the first spoke 120.

In response, in step 221, the route determining process 140, residing on the first spoke 120, receives the next hop determination 155 from the next hop server 135. In an example embodiment, the first spoke 120 receives second routing information 165 from the hub 110, the second routing information 165 associated with the second spoke 130. At the time the first spoke 120 receives the second routing information 165, the first spoke 120 resolves the next hop determination 155 by triggering a request to the next hop server 135, and in response, receiving the net hop determination 155 from the next hop server 135.

In step 222, the route determining process 140, residing on the first spoke 120, stores the next hop determination 155. In an example configuration, the first spoke 120 obtains second routing information 165 associated with the second spoke 130. The second routing information 165 is received from the hub 110. Upon receipt of the second routing information 165, the first spoke 120 transmits a NHRP request to an NHRP server 135, and in return, receives a next hop determination 155. The next hop determination 155 is cached on the first spoke 120.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method, comprising:
   transmitting, to a hub from a first spoke in a hub and spoke network, first routing information associated with the first spoke;
   in response to transmitting the first routing information, receiving, at the first spoke, from the hub, second routing information associated with a plurality of spokes in the hub and spoke network, the plurality of spokes including a second spoke;
   storing the second routing information in a routing table in the first spoke;
   receiving a packet at the first spoke; and
   forwarding the packet to a next-hop according to the second routing information.

2. The method of claim 1, where the second routing information comprises next-hop resolution information for the plurality of spokes in the hub and spoke network.

3. The method of claim 2,
   where the second routing information comprises quality of service information associated with a next-hop.

4. The method of claim 1, where transmitting the first routing information associated with the first spoke comprises:
   registering with a policy server to receive a policy; and
   receiving, from the policy server, the policy.

5. The method of claim 4,
   where the policy server is the hub; and
   where the hub and spoke network is a dynamic multipoint virtual private network (VPN) and the policy is a group policy that defines a group key for establishing tunnels between spokes in the hub and spoke network.

6. The method of claim 5, where the tunnel is a multipoint generic encapsulation (mGRE) tunnel and the hub and spoke network is a non-broadcast multiple access (NBMA) network.

7. The method of claim 1, wherein transmitting, to the hub from a first spoke, first routing information associated with the first spoke comprises:
   advertising, to the hub, a plurality of routes with which the first spoke is associated;
   where the routes comprise information for resolving next-hops.

8. The method of claim 1, comprising:
transmitting, to the hub, from the first spoke, a notification that a new address for the first spoke has replaced a previous address, the notification including a flag signaling the hub to recognize the new address associated with the first spoke; and
receiving notification that the hub has recognized the new address of the first spoke, and released the previous address.

9. The method of claim 1, comprising:
receiving a purge request at the first spoke, the purge request specifying that a third spoke in the hub and spoke network is unreachable; and
in response to the purge request, purging next-hop information related to the third spoke from the routing table.

10. The method of claim 1, comprising:
receiving, at the first spoke, from the hub, third routing information, where the third routing information specifies a change to the second routing information comprising one or more of, next-hop information about a new spoke and modified next-hop information about the plurality of spokes in the hub and spoke network.

11. The method of claim 1, comprising:
where forwarding the packet to a next-hop comprises encrypting the packet according to a group Internet Protocol Security (IPSec) security association (SA).

12. A computerized device, comprising:
a memory;
a processor;
a communications interface;
an interconnection mechanism coupling the memory, the processor and the communications interface;
wherein the memory is encoded with a route determining application that when executed on the processor determines a next hop for a packet in a Non-Broadcast Multiple Access (NBMA) hub and spoke Dynamic Multipoint Virtual Private Network (DMVPN) by performing the operations of:
transmitting, to a hub from a first spoke in the NBMA hub and spoke DMVPN, first routing information associated with the first spoke;
in response to transmitting the first routing information, receiving, at the first spoke, from the hub, second routing information associated with a plurality of spokes in the NBMA hub and spoke DMVPN, the plurality of spokes including a second spoke;
storing the second routing information in a routing table in the first spoke;
receiving a packet at the first spoke; and
forwarding the packet to a next-hop according to the second routing information.

13. The computerized device of claim 12, where the operation of transmitting, the first routing information associated with the first spoke comprises:
registering with a policy server to receive a policy; and
receiving, from the policy server, the policy.

14. The computerized device of claim 13 where the policy server is the hub; and
where the policy is a group policy that defines a group key for establishing tunnels between spokes in the NBMA hub and spoke DMVPN.

15. The computerized device of 14,
where the second routing information comprises quality of service information associated with a next-hop and next-hop resolution information for the plurality of spokes in the NBMA hub and spoke DMVPN; and
where the tunnel is a multipoint generic encapsulation (mGRE) tunnel.

16. The computerized device of claim 12, where transmitting, to the hub from a first spoke, first routing information associated with the first spoke, the computerized device performs the operation of:
advertising, to the hub, a plurality of routes with which the first spoke is associated;
where the routes comprise information for resolving next-hops.

17. The computerized device of claim 12, where the computerized device performs the operations of:
transmitting, to the hub, from the first spoke, a notification that a new address for the first spoke has replaced a previous address, the notification including a flag signaling the hub to recognize the new address associated with the first spoke; and
receiving notification that the hub has recognized the new address of the first spoke, and released the previous address.

18. The computerized device of claim 12, comprising:
receiving a purge request at the first spoke, the purge request specifying that a third spoke in the NBMA hub and spoke DMVPN is unreachable; and
in response to the purge request, purging next-hop information related to the third spoke from the routing table.

19. The computerized device of claim 12, comprising the computerized device performing the operation of:
receiving, at the first spoke, from the hub, third routing information, where the third routing information specifies a change to the second routing information comprising one or more of next-hop information about a new spoke and modified next-hop information about the plurality of spokes in the NBMA hub and spoke DMVPN.

20. The computerized device of claim 12, the computerized device
where forwarding the packet to a next-hop comprises encrypting the packet according to a group Internet Protocol Security (IPSec) security association (SA).

* * * * *

UNITED STATES PATENT AND TRADEMARK OFFICE
CERTIFICATE OF CORRECTION

| | | |
|---|---|---|
| PATENT NO. | : 7,602,737 B2 | Page 1 of 1 |
| APPLICATION NO. | : 11/414787 | |
| DATED | : October 13, 2009 | |
| INVENTOR(S) | : Asati et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 681 days.

Signed and Sealed this

Fifth Day of October, 2010

David J. Kappos
*Director of the United States Patent and Trademark Office*